F. W. LEE.
POTATO PLANTER.
APPLICATION FILED NOV. 15, 1919.

1,353,356.

Patented Sept. 21, 1920.

Inventor
Frank W. Lee

By Herbert E. Smith
Attorney

UNITED STATES PATENT OFFICE.

FRANK WILLIAM LEE, OF SPOKANE, WASHINGTON.

POTATO-PLANTER.

1,353,356.   Specification of Letters Patent.   Patented Sept. 21, 1920.

Application filed November 15, 1919. Serial No. 338,262.

*To all whom it may concern:*

Be it known that I, FRANK W. LEE, a citizen of the United States, residing at Spokane, in the county of Spokane, State of Washington, have invented certain new and useful Improvements in Potato-Planters, of which the following is a specification.

The present invention relates to an improved potato planter for selecting and depositing the seed potato behind the shovel of the implement, and the invention embodies a rotating dispenser, mounted upon the main axle to rotate therewith, and may be utilized in connection with a single row planter directly on and rotating with its driving axle.

The invention essentially involves the utilization in connection with the dispenser of a hopper and means within the dispenser, the latter being fashioned as a vertically disposed drum, for selecting a single seed potato and said selecting means is designed to positively retain the seed until it reaches the required operative position with relation to the planter tube in order that the seed may be released and fed through the planter tube for depositing in the trench at the rear of the shovel.

The combinations and arrangements of parts illustrated in the drawings and described and claimed in the accompanying specification show the physical embodiment of my invention according to the best mode I have so far devised for the practical application of the principles thereof.

Figure 1:
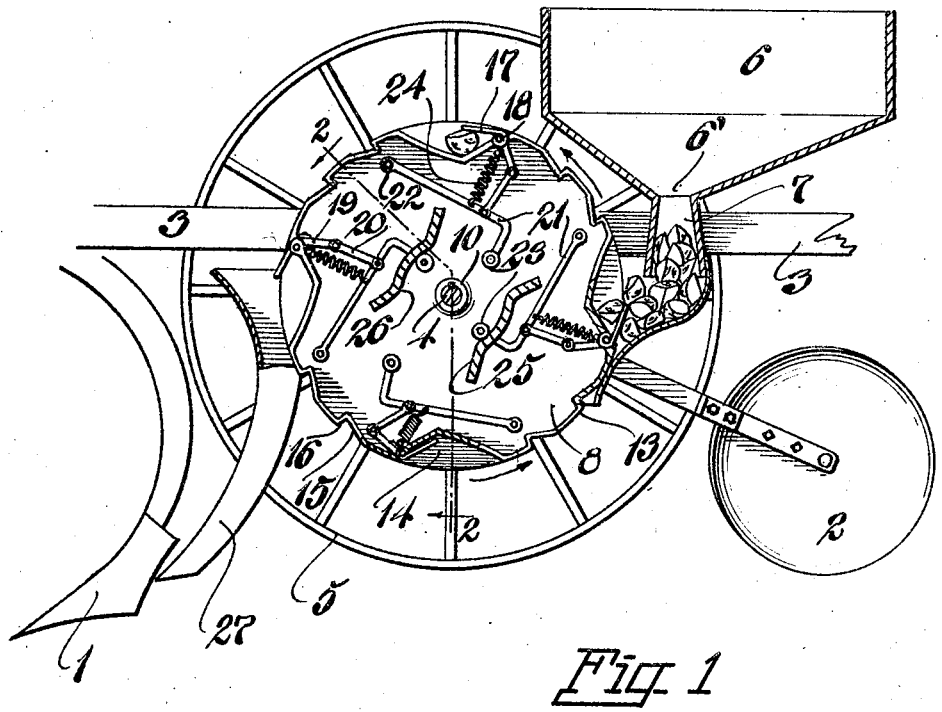
Figure 1 is a view in vertical section showing the dispenser and selecting and depositing devices within the dispenser, and related parts of the planter.

In order that the invention may be readily understood I have illustrated so much of a potato planter as is necessary for the purpose, the numeral 1 indicating the usual form of shovel for turning up a furrow or trench which is closed by the disk or track member 2 suitably supported from the frame indicated at 3. The driving axle 4 revolves with the traction wheel 5, and the hopper 6 for containing the seed potatoes is elevated and supported on the main frame in any proper manner, at the rear of the driving axle. Below the open lower, contracted end or bottom of the hopper, 6', which is fashioned as a throat, the feed tube 7 is supported and forms a portion of the hopper from which the seed potatoes are transferred to the dispenser, indicated as a whole by the numeral 8.

The dispenser, in the form of a flat, circular drum is provided with a side or cover plate 9, and the body of the drum and the plate are fashioned with complementary hub sections 10 and 11 respectively to which the shaft 4 is fixed so that the drum will revolve with the shaft. These two hub sections are formed on adjoining faces of their supporting members, and together, the sections form a continuous sleeve between the body of the drum and its closure plate, and the parts of the drum are thus held together, but do not revolve together. In Fig. 2 it will be seen that the side plate 9 is bolted to the channel iron or frame member 3, and the shaft 4 is journaled in the hub section 11 of this plate, a sleeve 12 being indicated for supporting and retaining the shaft and plate in proper relationship, the drum 8 however, which, together with the side plate forms the dispenser does rotate with the shaft in the direction of the arrow in Fig. 1, as the implement advances or is drawn by usual power.

The periphery of the drum is provided with a circumferential flange 13 in which is provided two pairs of diametrically arranged depressions, recesses, or pockets 14 all similar in structure and operation, and open at their outer faces to receive and contain the seed potatoes, and between these pockets are smaller depressions or notches 15 forming abrupt shoulders 16 which will agitate or stir up the seed potatoes in the feed hopper or tube 7, as the shoulders pass the opening of the feed tube.

At the rear end of each pocket an angular finger 17 is provided, its pivot point 18 extending transversely of the drum and its arm 19 being pivotally connected with the link 20 which link is in turn pivotally connected to the cam lever 21 that is pivoted at 22 in the drum. The cam lever 21 is provided at its bent end with an antifriction roller 23 and a spring 24 attached to the lever and to the drum causes the roller to properly engage one of the two cam plates 25 or 26.

The cam plates 25 and 26 are carried by or secured to the side plate 9 of the drum, and in the drawings, in the preferred arrangement, the cam plates are integral with the side plate and arranged diametrically opposite the shaft 4 and extend transversely of the drum, the cam plates of course remaining stationary while the cam levers with their rollers revolve with the drum about the shaft 4.

Figure 2:
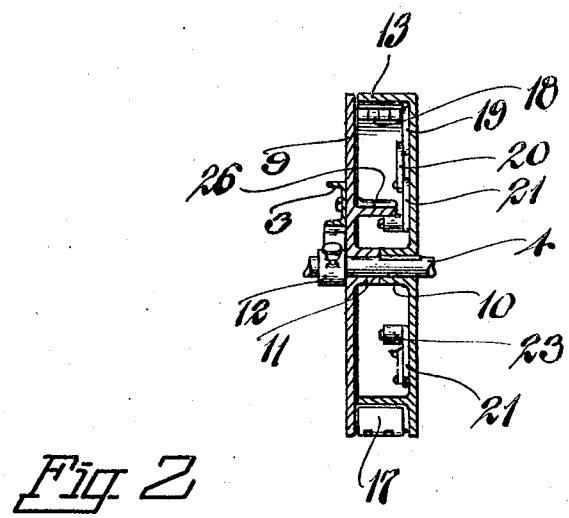
Fig. 2 is a transverse vertical sectional view of the dispenser.

In the arrangement of parts in the drum there are four gripping fingers for the seed potato and two cam plates for actuating these fingers, and in Fig. 1 of the drawings the action of the two plates and the fingers is shown, one finger selecting a single seed potato, at the right, and the other finger just having released the seed due to the cam plate 26. Thus, as the drum revolves, the fingers that are inoperative, as for instance the lowermost finger, are held within the perimeter of the drum, but when the roller 23 engages the cam 25, the finger is opened, away from the wall of the pocket and as the finger passes the open lower end of the feed tube 7 a seed potato is gripped between the finger and wall of the pocket due to the action of the cam and spring. The selected potato is carried, in the grip of the finger, up and over, as indicated at the upper point of the drum in Fig. 1, until the roller engages the cam plate 26, and the passage of the roller over the cam plate 26 causes the finger to swing out and release the seed potato at the proper point so that the seed falls to and through the planter tube 27 at the rear of the shovel 1. The seed thus is released and deposited through the planter tube, and the disk 2 covers the seed in the furrow in usual manner.

The throat 6' prevents an accumulation of excess seed potatoes in the feed tube 7, and the abrupt shoulders 16 of the rotating drum continually stir up the seeds in the feed tube, thus preventing congestion, and the fingers, as they successively pass the open lower end of the feed tube 7, grip only a single seed, as described.

What I claim is—

1. The combination with the driving axle and drum fixed thereon and seed gripping devices carried by said drum, of a non-rotatable closure plate for the drum having means for actuating said devices for selecting and releasing a seed, a hopper with a seed supply, and the planter tube for receiving the released seed.

2. The combination with the driving axle and drum rotatable therewith and seed pockets in the periphery of the drum, of a non-rotatable closure plate, gripping devices carried by the drum and co-acting with said pockets, and means on the plate for successively selecting and releasing a seed, as described.

3. The combination with the driving axle and drum having peripheral pockets and a seed gripping device for each pocket, of a non-rotatable closure plate having diametrically opposed cam plates, and each said gripping device including an actuating lever coöperating with the cam plates for successively selecting and releasing a seed.

4. The combination with the driving axle and drum formed with peripheral pockets, of a gripping finger for each pocket and an actuating lever for each finger, of a non-rotatable side plate formed with opposed cam plates to engage said gripping finger for successively selecting and releasing a seed.

5. The combination with the driving axle and its drum having peripheral shoulders as described and formed with peripheral pockets, of a pivoted gripping finger for each pocket, a pivoted actuating lever and a link connecting the finger and lever, a non-rotatable side plate, and opposed cam plates thereon to engage said lever for causing the finger to successively select and release a seed.

In testimony whereof I affix my signature.

FRANK WILLIAM LEE.